C. D. FARR.
ARMORED TIRE FOR VEHICLES.
APPLICATION FILED DEC. 2, 1908.
952,188.
Patented Mar. 15, 1910.
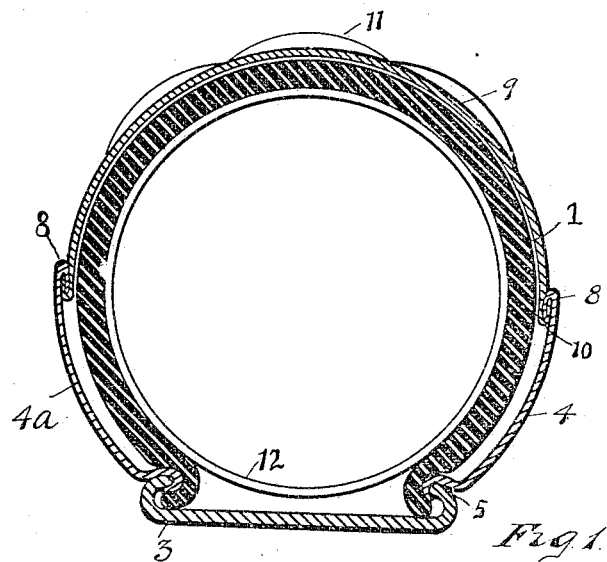
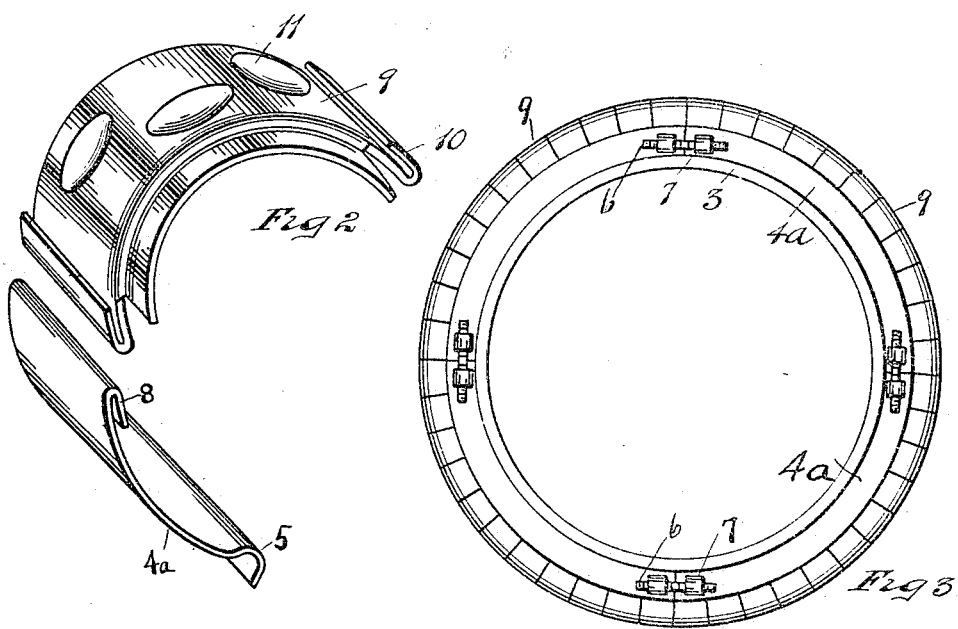

UNITED STATES PATENT OFFICE.

COMFORT D. FARR, OF DETROIT, MICHIGAN.

ARMORED TIRE FOR VEHICLES.

952,188.   Specification of Letters Patent.   Patented Mar. 15, 1910.

Application filed December 2. 1908. Serial No. 465,590.

*To all whom it may concern:*

Be it known that I, COMFORT D. FARR, a citizen of the United States, residing at Detroit, county of Wayne, State of Michigan, have invented a certain new and useful Improvement in Armored Tires for Vehicles, and declare the following to be a full, clear, and exact description of the same, such as will enable others skilled in the art to which it pertains to make and use the same, reference being had to the accompanying drawings, which form a part of this specification.

This invention relates to armored tires for vehicles.

It has for its object an improved tire armor adapted to prevent the tire from destructive abrasion, and from the puncturing effect of sharp articles over which the wheel may run.

In the drawings:—Figure 1, is a cross section of the tire and armor. Fig. 2, is a perspective view of a section of the armor. Fig. 3, is a side elevation. Fig. 4, is an enlarged detail longitudinal section of part of the armor.

1 indicates the rubber tire secured to the rim 3 of the wheel in the usual way. An annular guard or retaining plate 4 secured to the rim of the wheel by a grooved flange 5, extends entirely around the wheel on the one face of the wheel. On the opposite face of the wheel, the guard or retaining plate 4ª is made in sections, preferably in halves or quarters, secured together by bolts 6, which pass through ears 7 in the sections. Each of the guard plates 4 and 4ª is provided along its outer edge with an inturned flange 8, that, in the cross section shown in Fig. 1, has the appearance of a hook. Guard plates 9 warped to bend over the curvature of the tire 1, in its cross section, and to engage closely against the tire in its curvature around the wheel, are provided with curved flanged edges 10 that engage under the flanges 8 and interlock therewith, resting loosely therein, however, so that each of the guard plates 9 may yield in the direction of the radius of the wheel to an extent limited in their inward travel by the tire, and limited in their outward travel by the engagement of the flanges 10 and the flanges 8. The warped guard plate 9 is provided with raised bosses 11, which are of advantage in holding against the surface of the road over which the wheel is driven. The guard plates 9 engage in consecutive order around the wheel, as is shown in Fig. 4, where one guard plate is indicated at 9, and the successive plate on one end is 9ª, and on the other end is 9ᵇ. The end of the guard 9 engages under the end of the guard plate 9ª, the end being contracted to a cross sectional radius that is less than the cross sectional radius of the plate 9ª, in order that such engagement may be effected. On the opposite end of the guard plate 9, the radius of the cross section is larger than the radius of the cross section of the consecutive engaging plate 9ᵇ, in order that the end of the plate 9ᵇ may engage under the end of the plate 9.

12 is the inner tube of the tire, though it is obvious that this armor can be applied with equal efficiency to a single tube tire.

What I claim is:—

1. An armor for vehicle tires, having in combination an annular retaining plate adapted to be clamped along its inner edge between the side of a wheel tire and the adjacent portion of the rim, a plurality of individual retaining plates adapted to be similarly clamped on the opposite side of the tire and rim, bolt members whereby the individual plates may be correlated to form an annular retaining member, all of said plates having their outer edges bent over to constitute a retaining groove, and warped guard plates adapted to engage transversely over the tread portion of the tire, their lateral edge portions being bent over complementarily to the adjacent edge portions of the guard plates, and being adapted to engage therewith and to be held in place over the tire thereby, substantially as described.

2. In combination with a plurality of arched guard plates adapted to overlap one another with their meeting edges in their extent across the exposed wearing surface of a wheel tire, each lateral edge of each plate being provided with bent-over interlocking portions, a unitary annular retaining member adapted to engage one bent-over edge of each arched plate with its complementarily formed outer edge, and to be held in place by the engagement of its warped inner edge between the wheel tire and the adjacent portion of the wheel rim, and a plurality of segmental members similar in cross section to said annular retaining member, and adapted to engage said arched guard plates, and to be held in place between the tire and the rim similarly thereto, substantially as described.

In testimony whereof, I sign this specification in the presence of two witnesses.

COMFORT D. FARR.

Witnesses:
CHARLES F. BURTON,
WILLIAM M. SWAN.